United States Patent
Knapke et al.

(10) Patent No.: US 9,803,737 B2
(45) Date of Patent: Oct. 31, 2017

(54) LIMITED SLIP INTER-AXLE DIFFERENTIAL

(71) Applicant: Dana Heavy Vehicle Systems Group, LLC, Maumee, OH (US)

(72) Inventors: Brian V. Knapke, Toledo, OH (US); Jeremy M. Frenznick, Brighton, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 108 days.

(21) Appl. No.: 14/929,700

(22) Filed: Nov. 2, 2015

(65) Prior Publication Data

US 2017/0122422 A1   May 4, 2017

(51) Int. Cl.
| | | |
|---|---|---|
| *F16H 48/10* | (2012.01) | |
| *F16H 48/11* | (2012.01) | |
| *B60K 17/16* | (2006.01) | |
| *B60K 17/36* | (2006.01) | |
| *F16H 48/40* | (2012.01) | |
| *B60K 17/346* | (2006.01) | |
| *F16H 48/285* | (2012.01) | |

(52) U.S. Cl.
CPC ............ *F16H 48/10* (2013.01); *B60K 17/16* (2013.01); *B60K 17/20* (2013.01); *B60K 17/346* (2013.01); *B60K 17/36* (2013.01); *F16H 48/285* (2013.01); *F16H 48/40* (2013.01); *B60Y 2400/73* (2013.01)

(58) Field of Classification Search
CPC ........................... F16H 48/10; F16H 2048/106
See application file for complete search history.

(56) References Cited

U.S. PATENT DOCUMENTS

| | | | | |
|---|---|---|---|---|
| 1,413,855 A | * | 4/1922 | Krohn ..................... | F16H 48/10 475/174 |
| 1,420,798 A | * | 6/1922 | Weston ................... | F16H 48/10 74/650 |
| 2,462,000 A | * | 2/1949 | Randall ................. | F16H 48/285 475/227 |
| 2,651,215 A | * | 9/1953 | Schoenrock ............ | F16H 48/10 475/249 |
| 2,870,853 A | | 1/1959 | Keese | |
| 3,251,244 A | * | 5/1966 | Nickell ................... | F16H 48/10 475/252 |
| 3,406,593 A | | 10/1968 | Vesey | |
| 3,738,192 A | * | 6/1973 | Belansky ................ | F16H 48/10 475/249 |

(Continued)

*Primary Examiner* — Jacob S Scott
*Assistant Examiner* — Tinh Dang
(74) *Attorney, Agent, or Firm* — Marshall & Melhorn, LLC

(57) ABSTRACT

The present invention provides an improved inter-axle differential assembly to limit axle tire slip by limiting the excessive inter-axle differentiation between front and rear axles in a tandem axle set. The present invention provides an inter-axle differential assembly comprising a differential case including a cylindrical housing, an annular axial end surface connected to the cylindrical housing, an end cover plate wherein the annular axial end surface and the end cover plate include openings for receiving coaxial input and output shafts, a hollow chamber defined by the cylindrical housing, the annular axial end surface, and the end cover plate which houses differential gear assembly, and an unitary gear set extending continuously in the radial direction from the cylindrical housing.

9 Claims, 4 Drawing Sheets

(56) References Cited

U.S. PATENT DOCUMENTS

| | | | |
|---|---|---|---|
| 4,050,534 A | | 9/1977 | Nelson et al. |
| 4,831,890 A | | 5/1989 | Valentin et al. |
| 4,914,979 A | | 4/1990 | Balmforth |
| 5,147,252 A | * | 9/1992 | Mace .................. F16H 48/285 |
| | | | 252/75 |
| 5,205,797 A | | 4/1993 | Kobayashi et al. |
| 5,301,159 A | | 4/1994 | Lee |
| 5,484,348 A | * | 1/1996 | Brown ................ B60K 17/346 |
| | | | 475/248 |
| 5,533,944 A | | 7/1996 | Ichiki et al. |
| 5,730,679 A | | 3/1998 | Ichiki |
| 5,839,985 A | * | 11/1998 | Teraoka ................ F16H 48/10 |
| | | | 475/249 |
| 5,842,946 A | | 12/1998 | Ichiki |
| 6,705,966 B2 | | 3/2004 | Schroder et al. |
| 7,186,200 B1 | * | 3/2007 | Hauser .................. B60K 17/16 |
| | | | 192/48.91 |
| 7,955,208 B2 | * | 6/2011 | Kinoshita ............ B60K 17/346 |
| | | | 475/150 |
| 7,988,582 B1 | * | 8/2011 | Hauser .................. B60K 17/10 |
| | | | 192/13 R |
| 8,147,371 B2 | | 4/2012 | Hirota et al. |
| 8,439,152 B2 | * | 5/2013 | Visscher ............ B60K 17/342 |
| | | | 180/444 |
| 8,628,445 B2 | * | 1/2014 | Ohmura ................ F16H 48/11 |
| | | | 475/252 |
| 9,115,795 B2 | * | 8/2015 | Biermann ............ F16H 57/082 |
| 9,267,592 B2 | * | 2/2016 | Martini .................. F16H 48/11 |
| 2006/0160652 A1 | * | 7/2006 | Maki ...................... F16H 48/10 |
| | | | 475/248 |
| 2008/0090692 A1 | | 4/2008 | Gates |

* cited by examiner

LIMITED SLIP INTER-AXLE DIFFERENTIAL

FIELD OF THE INVENTION

The present invention relates to a limited slip differential having a mechanism for splitting input shaft torque between the front and rear axles of a tandem axle set. This invention can limit axle tire slip passively by limiting the excessive inter-axle differentiation between the front and rear axles in a tandem axle set.

BACKGROUND OF THE INVENTION

A conventional assembly for heavy-duty trucks used in on-road and off-road service includes a tandem axle assembly. Tandem axle assemblies commonly employ inter-axle differentials to divide power between the forward and rear axle assemblies. The forward and rear axle assemblies each include a pair of axle half shafts extending therefrom on which one or more wheels of a vehicle are mounted. The inter-axle differential enables speed differences between the drive axles, e.g., to allow torque balance between the drive axles during the vehicle cornering, to compensate for tire size differences, etc.

Inter-axle differential gear mechanisms, or differentials, are well-known devices. Inter-axle differentials can include a pair of side gears in mesh with, and driven by, the pinion gears. One side gear is used to drive the pinion gear of the forward axle assembly wheel differential. The other side gear is coupled to an output shaft that extends outwardly from the forward axle assembly housing and drives the intermediate drive shaft assembly and, indirectly, the pinion gear of the rear axle assembly wheel differential.

It may be necessary to lock the inter-axle differential to prevent power from being delivered to a wheel that has lost traction during hazardous driving conditions. In conventional inter-axle differentials, a locking clutch member is disposed about the input shaft and can be shifted into engagement with a second clutch member typically defined by one of the side gears to lock the inter-axle differential.

Although many limited slip differential devices are known, there is a need for an invention that can passively limit inter-axle differential without intervention from the operator, limiting damage caused by improper lock out clutch engagement. The deletion of the lock out clutch may also reduce the overall cost as well.

SUMMARY OF THE INVENTION

The present invention provides an improved inter-axle differential assembly to limit axle tire slip by limiting the excessive inter-axle differentiation between front and rear axles in a tandem axle set. The slip limitation occurs passively without any intervention from the operator limiting potential damages to the axle from improper lock out clutch engagement.

Accordingly, the present invention provides an inter-axle differential assembly comprising a differential case including a cylindrical housing, an annular axial end surface connected to the cylindrical housing with an opening for receiving an input shaft, an end cover plate adjacent to cylindrical housing on the axial opposite end than the axial end surface with an opening for receiving an output shaft, a hollow chamber defined by the cylindrical housing, the axial end surface and the cover plate which houses a differential gear assembly, and an unitary gear set extending continuously in the radial direction from the cylindrical housing. The assembly distributes drive torque from an input shaft to an output shaft and the unitary gear set cut into a differential case. The unitary gear set sends torque to the front axle of the tandem axle set and the output shaft sends torque to the rear axles of the tandem axle set.

BRIEF DESCRIPTION OF THE DRAWINGS

The above, as well as other advantages of the present invention, will become readily apparent to those skilled in the art from the following detailed description when considered in the light of the accompanying drawings in which.

The preferred embodiments of the present invention will now be described with the reference to the accompanying drawings.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
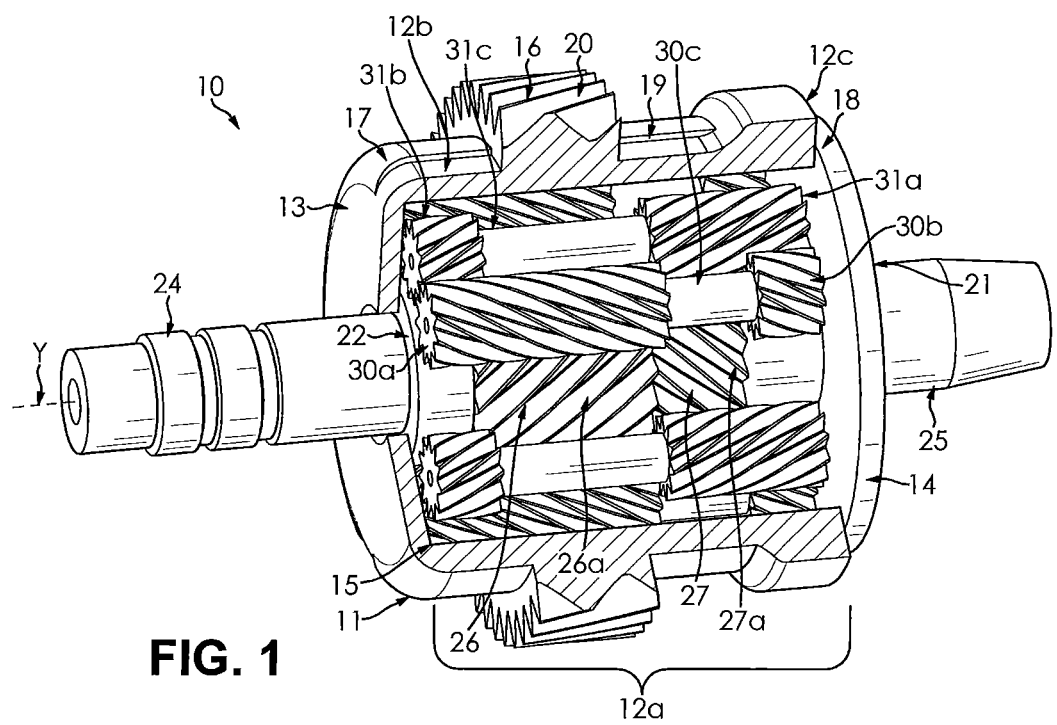
FIG. 1 is a cut-away view of the inter-axle differential assembly according to the preferred embodiment of the present invention.

Referring to FIG. 1, which illustrates a cut-away view of the inter-axle differential assembly 10 of a first preferred embodiment, the differential assembly 10 includes a differential case 11 having a cylindrical housing 12 extending along a central axis Y having an outer radial surface 12a, an axial end surface 13 and an end cover plate 14, which define a hollow chamber 15. The differential case 11 is rotatable around axis Y. An unitary gear set 16 extends from the outer radial surface 12a of the cylindrical housing.

Outer radial surface 12a includes two end portions 12b and 12c. End portion 12b is directly and continuously connected to an edge portion 17. Edge portion 17 is a rounded radial edge that is directly and continuously connected to axial end surface 13. The axial end surface 13 is substantially planar and perpendicular to outer radial surface 12a. Cylindrical housing 12 has a planar axial end surface 18 that is perpendicular to outer radial surface 12a. Axial end surface 18 is directly and continuously connected to end portion 12c.

Outer radial surface 12a also contains a recessed portion 19. The diameter of recessed portion is less than the diameter of end portions 12b,12c. Recessed portion 19 is directly and continuously in contact with end portion 12c and unitary gear set 16.

Unitary gear set 16 extends continuously radially outward from the outer radial surface 12a and is in direct and continuous contact with end portion 12b and recessed portion 19. Unitary gear set 16 has teeth 20 extending radially outward and teeth 20 have a diameter larger than the diameter of end portions 12b,12c. Unitary gear set 16 is slightly offset from the center of case 11.

Figure 4:
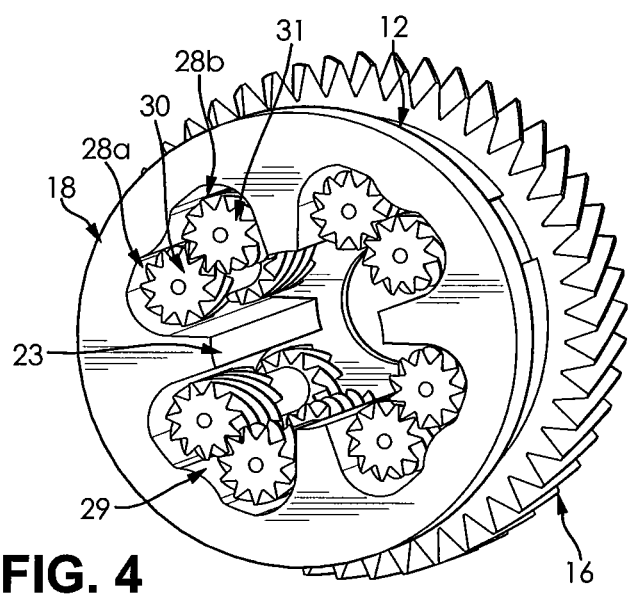
FIG. 4 is an end view of the cylindrical housing and pinion arrangement according to the preferred embodiment of the present invention.

As shown in FIGS. 1 and 4, axial end surfaces 13,18, edge portion 17, end portions 12b,12c, unitary gear set 16, and recessed portion 19 respectively define differential case 11 as a one-piece construction.

End cover plate 14 is a substantially planar annular plate which is parallel and adjacent to axial end surface 18 and perpendicular to the Y axis. End cover plate 14 includes an axial opening 21.

As shown in FIGS. 1 and 4, axial end surfaces 13,18 have openings 22,23 for receiving input 24 and output 25 shafts respectively. Input shaft 24 and output shaft 25 face each other on the Y axis. Input and output shafts 24,25 are rotatably received in case 11 and are coaxial with case 11.

An input side gear 26 is mounted on input shaft 24 and has teeth 26a extending radially on the outer periphery of side gear 26. Side gear 26 is located inside hollow chamber 15 and input shaft 24 extends outside case 11 in the axial direction through opening 22 in axial end surface 13.

An output side gear 27 is mounted on output shaft 25 and has teeth 27a extending radially on the outer periphery of side gear 27. Side gear 27 is located inside hollow chamber 15 and output shaft 25 extends outside case 11 in the axial direction through opening 23 in axial end surface 18 and opening 21 of end cover plate 14.

Helical teeth 26a,27a of side gears 26,27 are equal to each other in helical angles, but in opposite directions. The helical direction of the side gears 26,27 may be arranged in the reverse direction as shown, or with all the helical directions flipped.

A set of paired pockets 28a,28b, as illustrated in FIG. 4, are formed on the radially inner surface 29 of cylindrical housing 12. The paired pockets 28a,28b extend in parallel relation to the Y axis and are cylindrical. Pockets 28a,28b receive a set of pinions comprising an input pinion 30 and an output pinion 31. Pinions 30,31 are capable of rotating in pockets 28a,28b.

Figure 2:
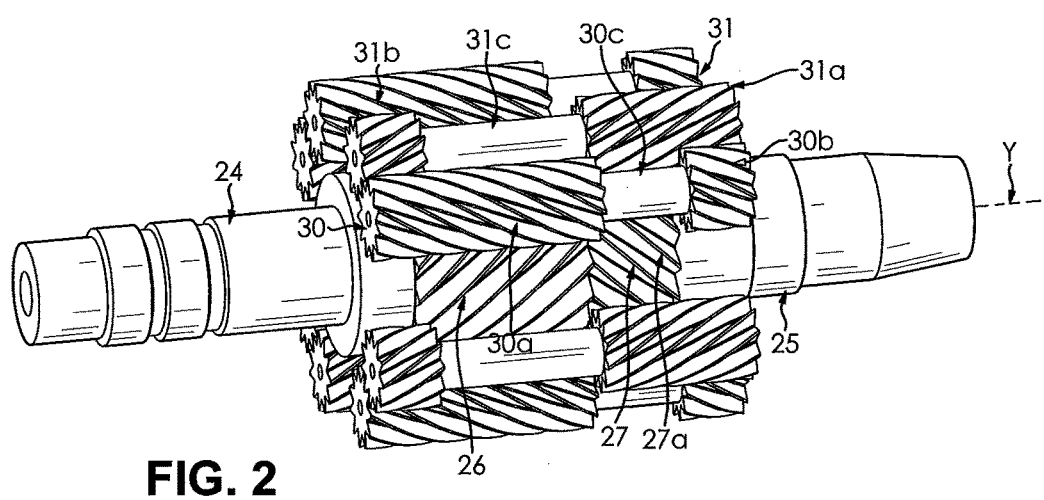
FIG. 2 is a view of the differential gears according to the preferred embodiment of the present invention.

As illustrated in FIGS. 1 and 2, at least one input pinion 30 is located within case 11. Input pinion 30 has a first gear portion 30a and a second gear portion 30b located on the outer periphery of pinion 30. First gear portion 30a is separated from second gear portion 30b by a shaft 30c.

At least one output pinion 31 is located within case 11 as shown in FIG. 1. Output pinion 31 has a first gear portion 31a and a second gear portion 31b located on the outer periphery of the pinion 31 as illustrated in FIGS. 1 and 2. Second gear portion 31b is separated from first gear portion 31a by a shaft 31c. The pinion gear portions 30a,30b,31a, 31b can have helical teeth. Helical teeth of pinions 30,31 are equal to each other in helical angles, but in opposite directions. The helical direction of the pinions 30,31 may be arranged in the reverse direction as shown, or with all the helical directions flipped.

Output pinion first gear portion 31a is meshed with input pinion second gear portion 30b and output pinion second gear portion 31b is meshed with input pinion first gear portion 30a.

Pinions 30,31 are located circumferentially around input side gear 26 and output side gear 27 allowing the input pinion first gear portion 30a to engage with teeth 26a of input side gear 26 and output pinion first gear portion 31a to engage with teeth 27a of output side gear 27.

As illustrated in FIG. 1, unitary gear set 16 is positioned on cylindrical housing 12 so that it is axially aligned with input side gear teeth 26a. Unitary gear set 16 is also axially aligned with first gear portion 30a of input pinion 30 and with output pinion shaft 31c in the preferred embodiment.

FIGS. 1 and 4 illustrate the preferred embodiment wherein four sets (or pairs) of input pinions 30 and output pinions 31, which function as planet gears, are positioned within chamber 15 forming separate gear trains for rotating side gears 26,27 in opposite directions. Although the illustrated differential assemblies include four sets of pinions, the assemblies can comprise additional or fewer pairs of combination pinions to provide a similar connection between the side gears. The pinions can also be grouped in sets of more than two pinions, for example, groups of three pinions including two input pinions and one output pinions, or vice versa. The number of pockets included in the assembly will correspond to the number of pinion sets.

Figure 3:
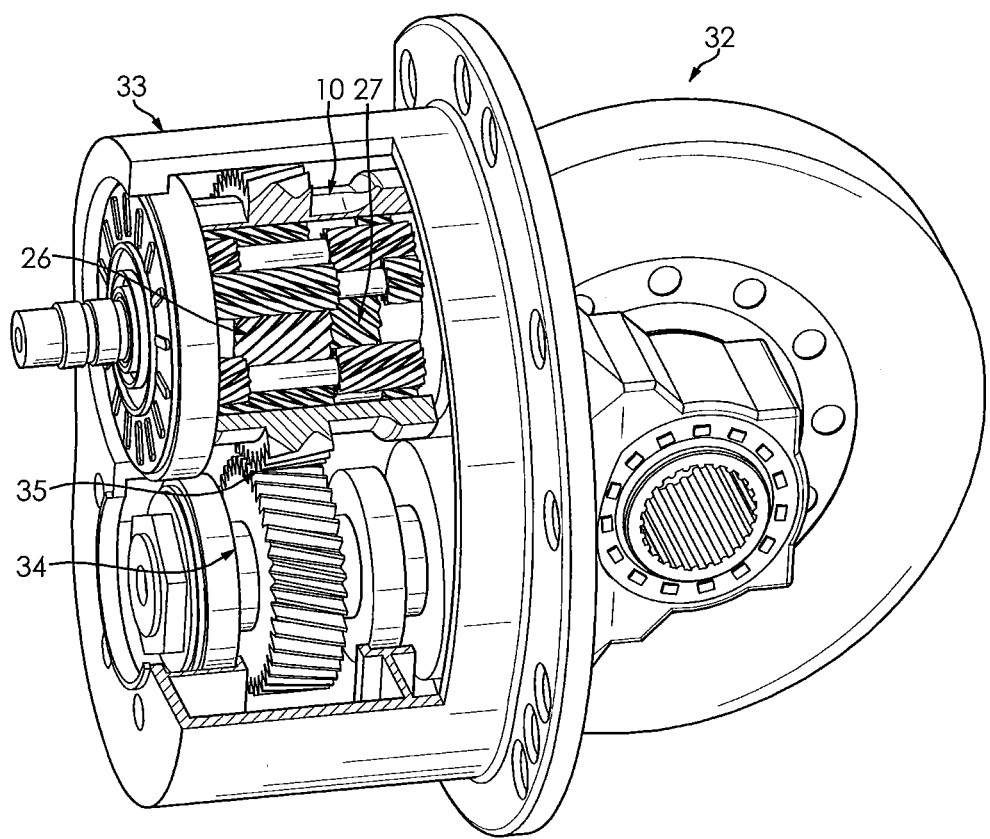
FIG. 3 is a cut-away view of the inter-axle differential assembly in an axle assembly according to the preferred embodiment of the present invention.

FIG. 3 illustrates a cut-away view of inter-axial differential assembly 10 of the first preferred embodiment in an axle assembly 32. Axle assembly 32 includes a housing 33 and has a toothed pinion shaft 34 positioned parallel to, but axially offset from, input side gear 26 and output side gear 27 and located within axle assembly housing 33. The toothed pinion shaft 34 has radially extending teeth 35 that engage the teeth of the unitary get set 16. Toothed pinion shaft 34 has a pinion gear (not shown) that engages with a ring gear (not shown).

Input torque from a transmission (not shown) to the inter-axle differential assembly 10 is transmitted through the input shaft 24. The torque is transmitted from input shaft 24 to the planetary gear arrangement of pinions 30,31 via input side gear 26. The output torque is split between unitary gear set 16 and an output shaft 25 via output side gear 27 and pinions 30,31. Teeth 20 of unitary gear set 16 send torque to a front axle of a tandem axle set. Output shaft 25 sends torque to rear axles of the tandem axle set.

In accordance with the provisions of the patent statutes, the present invention has been described in what is considered to represent its preferred embodiments. However, it should be noted that the invention can be practiced otherwise than as specifically illustrated and described without departing from its spirit or scope.

We claim:

1. A differential case, comprising:
   a cylindrical housing extending along a central axis and rotatable along the axis, including an outer radial surface;
   an annular axial end surface connected to the cylindrical housing, wherein the annular axial end surface includes an opening for receiving an input shaft;
   an end cover plate adjacent to the cylindrical housing on the axial opposite end than the annular axial end surface, wherein the cover includes an opening for receiving an output shaft;
   a unitary gear set extending continuously in the radial direction from the outer radial surface of the housing having helical teeth; and
   wherein the cylindrical housing, the annular axial end surface and the end cover plate define a hollow chamber, the chamber housing a differential gear assembly including an input pinion and an output pinion;
   wherein the input pinion comprises a first gear and a second gear separated from the first gear by a shaft and the output pinion comprises a first gear and a second gear separated from the first gear by a shaft;

wherein the output pinion first gear is meshed with the input pinion second gear and the output pinion second gear is meshed with the input pinion first gear;

wherein the input pinion first gear is meshed with the input side gear and the output pinion first gear is meshed with the output side gear; and the unitary gear set is axially aligned with the input pinion first gear and an input side gear.

2. The differential case of claim 1, wherein the cylindrical housing, annular axial end, and unitary gear set is a one piece construction.

3. The differential case of claim 1, wherein the differential gear assembly comprises:
the input side gear mounted on the input shaft;
an output side gear mounted on the output shaft; and
a planet gear set disposed between the side gears and the housing, wherein the planet gear set is rotatable inside the housing.

4. The differential case of claim 3, wherein input side gear includes a set of teeth extending radially outward, wherein the unitary gear set is axially aligned with the teeth of the input side gear.

5. An inter-axle differential assembly, comprising:
a cylindrical housing extending along a central axis and rotatable along the axis, including an outer radial surface;
an annular axial end surface connected to the cylindrical housing, wherein the annular axial end surface includes an opening for receiving an input shaft;
an end cover plate adjacent to the cylindrical housing on the axial opposite end than the annular axial end surface, wherein the end cover plate includes an opening for receiving an output shaft;
a unitary gear set extending continuously in the radial direction from the outer radial surface of the cylindrical housing having helical teeth;
wherein the cylindrical housing, annular axial end surface and end cover plate define a hollow chamber housing a planetary differential gear assembly comprising an input side gear mounted on the input shaft, an output side gear mounted on the output shaft and at least one input pinion and at least one output pinion; and
wherein the unitary gear set is axially aligned with the input side gear;
wherein the at least one input pinion comprises a first gear and a second gear separated from the first gear by a shaft and the least one output pinion comprises a first gear and a second gear separated from the first gear by a shaft;

wherein the output pinion first gear is meshed with the input pinion second gear and the output pinion second gear is meshed with the input pinion first gear;

wherein the input pinion first gear is meshed with the input side gear and the output pinion first gear is meshed with the output side gear; and the unitary gear set axially aligned with the input pinion first gear.

6. The inter-axle differential assembly of claim 5, wherein the planetary assembly comprises four pinion sets wherein one input pinion and one output pinion form a pinion set.

7. The inter-axle differential assembly of claim 5, wherein the planetary assembly comprises four pinion sets wherein two input pinions and one output pinion form a pinion set.

8. The inter-axle differential assembly of claim 5, wherein the planetary assembly comprises four pinion sets wherein one input pinion and two output pinions form a pinion set.

9. An inter-axle differential assembly, comprising;
a differential case including a cylindrical housing extending along a central axis and rotatable along the axis and having an outer radial surface, an annular axial end surface connected to the cylindrical housing, the annular axial end surface including
an opening for receiving an input shaft, an end cover plate adjacent to the cylindrical housing on the axial opposite end than the annular axial end surface, the end cover plate including an opening for receiving an output shaft,
wherein the cylindrical housing, the annular axial end surface and the end cover plate define a hollow chamber, the chamber housing a differential gear assembly, an input pinion and an output pinion;
wherein a unitary gear set extending continuously in the radial direction from the outer radial surface of the housing having helical teeth;
wherein a toothed pinion shaft which engages the unitary gear set, wherein the tooth pinion shaft is parallel to, but axially offset from the input and output shafts and the pinion shaft has a pinion gear;
wherein the one input pinion comprises a first gear and a second gear separated from the first gear portion by a shaft and the output pinion comprises a first gear and a second gear separated from the first gear by a shaft;
wherein the output pinion first gear is meshed with the input pinion second gear and the output pinion second gear is meshed with the input pinion first gear;
wherein the input pinion first gear is meshed with the input side gear and the output pinion first gear is meshed with the output side gear; and
the unitary gear set is axially aligned with the input pinion first gear and an input side gear.

* * * * *